US006387501B1

(12) United States Patent
McCrary et al.

(10) Patent No.: US 6,387,501 B1
(45) Date of Patent: May 14, 2002

(54) PHENOLIC COATED REFRACTORY AGGREGATES

(75) Inventors: Avis Lloyd McCrary, Louisville; Jimmy Pingao Chen, Prospect; Pitchaiya Chandramouli, Louisville, all of KY (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/365,418

(22) Filed: Aug. 2, 1999

(51) Int. Cl.$^7$ .................................................. B32B 5/16
(52) U.S. Cl. ...................... 428/404; 427/221; 428/407
(58) Field of Search ............................... 427/212, 221; 428/403, 407, 404

(56) References Cited

U.S. PATENT DOCUMENTS

| | | |
|---|---|---|
| 4,439,489 A | 3/1984 | Johnson et al. |
| 4,888,240 A | 12/1989 | Graham et al. |
| 5,218,038 A | 6/1993 | Johnson et al. |
| 5,403,791 A | 4/1995 | Minami |
| 5,686,506 A | 11/1997 | Gerber |
| 5,760,104 A | 6/1998 | Gerber |

OTHER PUBLICATIONS

Phenolic Resin, Andrew Knop and Louis A. Plato, Springer Verlag, Berlin, Germany, 1985, pp. 31–49.

*Primary Examiner*—Hoa T. Le
(74) *Attorney, Agent, or Firm*—Stevens, Davis, Miller & Mosher, L.L.P.

(57) ABSTRACT

A method for forming resin coated refractory aggregates and the resulting resin coated aggregates which can be used for forming refractory shapes such as furnace linings, bricks, etc. The process includes contacting a heated refractory material in particulate form with a resin or resin solution which is then shaped or projected or otherwise compacted, exhibiting high green strength when cold pressed. Substantially reduced organic emissions are the result.

21 Claims, No Drawings

PHENOLIC COATED REFRACTORY AGGREGATES

BACKGROUND OF THE INVENTION

1. Field of the Invention

The invention relates to resin coated aggregates, especially resin coated refractory aggregates, which can be used for forming refractory shapes, such as furnace linings, bricks, runners, pouring shrouds, slide gates, and other refractory structures, and to processes of their use.

2. Description of the Related Art

It is known in the refractory art to form monolithic structures, bricks and other shapes, by mixing a particulate refractory material with a mixture of a solvent and resin as a binder, shaping the resulting mass of refractory and binder and heating the mass to drive off the solvent and harden the resin.

However, such prior heating processes drive off large amounts of solvent, which is an undesired pollutant of the atmosphere.

There is a continuing need to avoid the pollution of the environment and other hazards associated with the solvent containing refractory particulate mixes and processes of the prior art.

SUMMARY OF THE INVENTION

It is therefore, an object of the invention to form resin-coated refractory mixes without using the large amounts of solvent associated with the prior art systems.

It is a further object of the invention to form substantially solventless refractory particulates into monolithic structures, bricks and other shapes by binding refractory particulates into such shapes through the use of a binder having little or no solvent.

It is a still further object to reduce pollution of the environment while obtaining refractory mixes which can be formed into monolithic structures and other shapes.

These and other objects will become apparent from the following description of the preferred embodiments.

DESCRIPTION OF THE PREFERRED EMBODIMENTS

Refractory materials, especially refractory particulates (referred to hereinafter as "refractory aggregates") are particularly useful in high temperature environments, such as the refining, handling and transporting of molten ferrous and non-ferrous metals.

Refractory aggregates include such materials as silicon carbide, alumina, magnesia, doloma, graphite, carbon, silica, zirconia, and other metal oxides, nitrides, carbides, etc., which exhibit refractory properties.

The refractory aggregates usually are available in a range of particle sizes, or can be crushed and/or sieved to yield a desirable range of particle sizes. Although, particle size in the invention is not critical, we use refractory aggregates passing through screens of 5 mesh to being retained on a 300 mesh (−5 to 300 mesh), preferably −5 to 100 mesh. (All mesh sizes in this application refer to the U.S. mesh system.)

The refractory aggregates of the invention are heated to a temperature to activate a thermosetting resin to convert it to B-stage or to soften a thermoplastic resin generally within the range of 140° F.–500° F., preferably 250° F.–375° F., such as by placing the refractory in an oven or other suitable heating device.

Once heated, a resinous material is charged to the refractory aggregate and vigorously mixed to uniformly disperse and/or melt the resin which becomes coated onto the surface of the refractory aggregate. Amounts of resin between 1 and 15 wt %, preferably 5 to 15 wt %, based on the weight of the aggregates are usually sufficient to coat the refractory aggregate. To some extent, the amount of resin will be based on the surface area of the aggregate, which varies inversely to the size of the aggregate. The foregoing weight percentage is based on weight of solids, e.g. resin in powder form. If resin solution were used, the weight percentage refers to the weight of the resin solids making up the solution.

Once coated, the aggregate may be packaged, packed in bulk for transportation to the site of use, or used directly for forming refractory shapes, bricks and other shapes to which refractories are commonly used.

Shaping can occur in molds or against surfaces. The refractory aggregate can be projected against the inner surfaces of equipment, such as ladles or furnaces, can be rammed, pressed or otherwise compacted and will exhibit high green strength when cold pressed. When being formed, the resulting refractory mass will not emit hazardous solvent vapors thereby reducing risk of fire or explosion and will reduce environmental pollution and health risks of workers.

As suitable resinous materials can be used the class of synthetic resins known as phenolics, especially novolacs, which are thermoplastic resins based on the reaction product of a phenol-aldehyde system.

Phenolic resins are generally regarded as comprising thermosetting resins or "resoles" and thermoplastic resins or "novolacs." The different properties obtainable from these resin systems can be controlled by the relative ratio of the components of the phenolic system.

For example, resoles are produced by the reaction of a phenol and a molar excess of a phenol-reactive aldehyde, typically in the presence of an alkali or alkaline earth metal compound as a condensing catalyst. They may also be prepared by employing metal free quaternary ammonium hydroxide or organic amines as the catalyst.

On the other hand, to obtain a resin having the properties of a novolac, that is to say, to obtain a product which does not thermoset upon heating, it is necessary to react the phenol and the aldehyde in a molar ratio of less than 1 mole of aldehyde to each mole of the phenol.

Novolac resin may be prepared using suitable acid catalysts which include the strong mineral acids, such as sulfuric, phosphoric and hydrochloric acids, and organic acids, such as oxalic and salicyclic acids or anhydrides, such as maleic anhydride.

As stated above, the phenol and aldehyde are reacted together in a molar ratio of less than 1 mole of aldehyde to each mole of the phenol. In general, the aldehyde will not be used in a molar ratio to phenol of less than 0.2:1. Preferably, the aldehyde used is formaldehyde at a preferred formaldehyde:phenol molar ratio of from about 0.4:1 to about 0.85:1. The formaldehyde may be replaced by benzaldehyde, acetaldehyde, butylaldedehyde and other aldehydes known to those skilled in the art and the phenol may be partially replaced by cresols, xylenols, napthols or bisphenol-A or other materials known to those skilled in the art.

Methods for the preparation of novolac resins are well known and are described, for example, in *Phenolic Resin*, by Andrew Knop and Louis A. Plato, Springer Verlag, Berlin, Germany, 1985.

Other materials which have been added to novolac resins include solvents. Solvents typically in amounts of 30–50 wt % reduce the viscosity of the resin permitting it to flow more freely and, thus, have been used to coat refractory aggregate.

However, the presence of such solvent amounts results in the hazardous emission of solvent vapor upon handling and forming the resulting refractory aggregate-binder mass.

We have found that the solvent content can be substantially reduced or eliminated while still being able to coat refractory aggregate with a phenolic resin by the process of heating the refractory aggregate before charging the resin.

Organic emissions, expressed in terms of LOI (lost on ignition) of approximately 2–15 wt % for the combination of resin, plasticizers and water have been experienced when the solvent content is 2–3 wt % (based on the weight of other components including aggregate). Solventless systems will result in even lower emissions (lower LOI) than that expressed above.

Plasticizers can be added in an amount of about 1.0 to about 2.0 wt % (based on the weight of the aggregate). Plasticizers such as esters, polyols and other materials known to those skilled in the art can be employed.

The invention will be further understood by reference to the following Example.

Example 1

The following components are weighed:

| | |
|---|---|
| (A.) Magnesia (–18 mesh) | 1000 g |
| (B.) Graphite | 50 g |
| (C.) Novolac resin (BR-660A flake) | 90 g |
| (D.) HEXA | 9.5 |
| (E.) Water | 4.5 |
| (F.) Plasticizer | 15 |

Component (A) is preheated to 325° F. in an oven; then (B) is charged and mixed for 1 minute; Component (C) is charged and timer started. At 3 minutes charge a premix of (D) (E) at low speed mixing, at 3.5 minutes (F) is charged and mixed vigorously until 9 minutes from start of timer. Temperature is checked to assure melting and dispersion. Resulting aggregates are free flowing upon discharge from mixer.

"HEXA" as used above refers to hexamethylene tetramine, and acts as a cross-linking agent for the novolac.

Other additives which may be included are antioxidants, minerals, flow modifiers, inert extenders, fillers, water and other enhancers, as well as other modifiers known to those skilled in the art for incorporation into the final article.

Thus, it is evident that those skilled in the art may add to or modify the invention without departing from the spirit thereof.

We claim:

1. A resin coated refractory aggregate formed by the process of:
   (A) preheating a refractory aggregate selected from the group consisting of magnesia, doloma, graphite, carbon, silicon carbide and combinations thereof to a temperature above the softening point of a resin to be added to the refractory aggregates;
   (B) adding a resin to the heated refractory aggregate of step (A);
   (C) mixing the resin and heated refractory aggregate under conditions so as to coat the refractory aggregate with resin; and
   (D) recovering a free-flowing resin coated refractory aggregate.

2. The refractory aggregate of claim 1, wherein the resin comprises a phenolic resin selected from the group consisting of resoles and novolacs.

3. The refractory aggregate of claim 1, wherein the resin is a novolac resin further comprising a cross-linking agent and at least one diluent selected from the group consisting of plasticizers, antioxidants, flow modifiers, water and inert extenders.

4. The refractory aggregate of claim 3, wherein the resin further comprises not more than about 2 wt % solvent, based on the weight of the resin.

5. The refractory aggregate of claim 3, wherein no solvent is present.

6. The refractory aggregate of claim 1, formed into a refractory shape.

7. A process of forming refractory shapes from refractory aggregate comprising:
   (A) preheating a refractory aggregate to a temperature above the softening point of a resin to be added to the aggregate;
   (B) contacting a resin with the heated aggregate of step (A);
   (C) mixing the resin and heated aggregate under conditions so as to coat the aggregate with resin; and
   (D) forming the coated aggregate into a refractory shape.

8. The process of claim 7 wherein the temperature is above about 140° F.

9. The process of claim 7 wherein the resin is a novolac.

10. The process of claim 9 wherein the resin further contains a cross-linking agent.

11. The process of claim 7 wherein the resin contains not more than 2 wt % solvent, based on the weight of the resin.

12. The process of claim 7 wherein the steps (A)–(D) are performed in the absence of a solvent.

13. The process of claim 7 wherein the refractory aggregate is a mixture of at least two different types of refractory aggregate.

14. The process of claim 7 further comprising the addition of a cross-linking agent after step (B).

15. The process of claim 7 including recovering a free flowing coated aggregate between steps (C) and (D).

16. The process of claim 7, wherein the refractory aggregate is one selected from the group consisting of alumina, magnesia, doloma, graphite, carbon, silicon, zirconia, silicon carbide and combinations thereof.

17. A process of forming refractory shapes from refractory aggregate comprising:
   (A) preheating a refractory aggregate to a temperature sufficient to convert a thermosetting resin to a B-stage cure;
   (B) contacting a resin comprising a resole resin with the heated aggregate of step (A);
   (C) mixing the resin and heated aggregate under conditions so as to coat the aggregate with resin; and
   (D) forming the coated aggregate into a refractory shape.

18. The process of claim 17 wherein the refractory shape is further heated to cure the B-stage cured resin.

19. The process of claim 17 wherein steps (A)–(D) are performed in the absence of solvent.

20. The process of claim 17 including recovering free flowing coated aggregates between steps (C) and (D).

21. The process of claim 17, wherein the refractory aggregate is one selected from the group consisting of alumina, magnesia, doloma, graphite, carbon, silicon, zirconia, silicon carbide and combinations thereof.

* * * * *